Sept. 5, 1944.　　　H. W. RUPPEL　　　2,357,427
SPINDLE DRIVE
Filed May 11, 1940　　　4 Sheets-Sheet 1
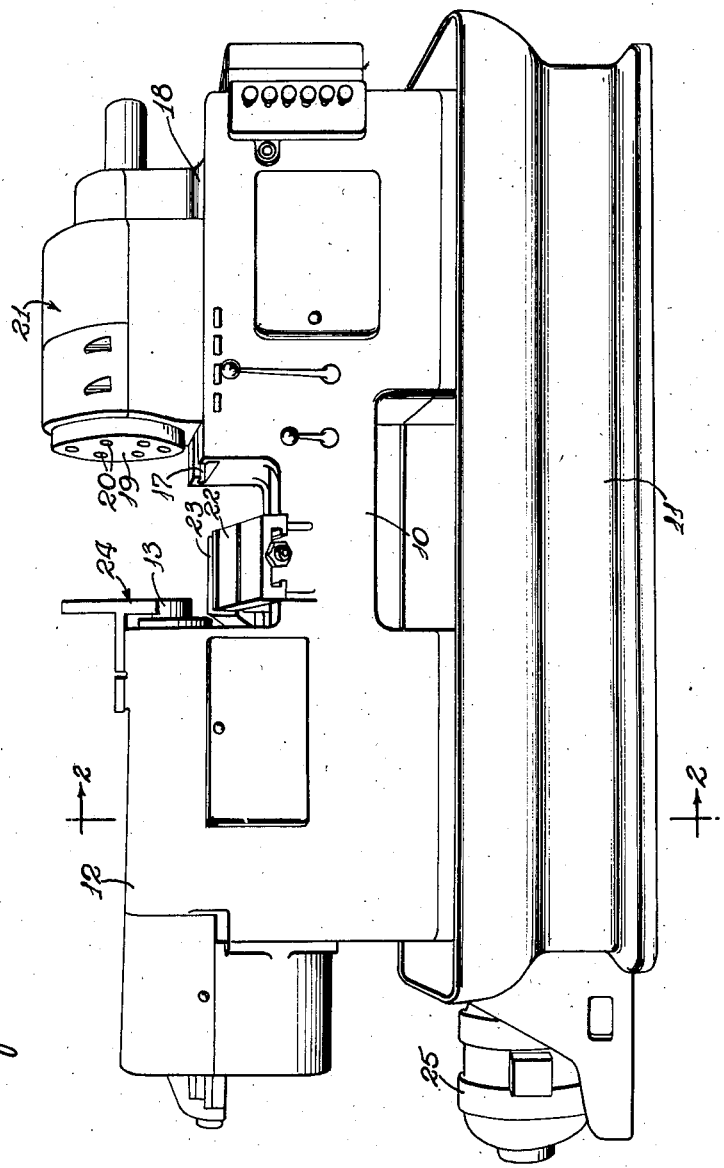
INVENTOR.
Harry W. Ruppel
BY
Parker, Carlson, Pitner & Hubbard
ATTORNEYS

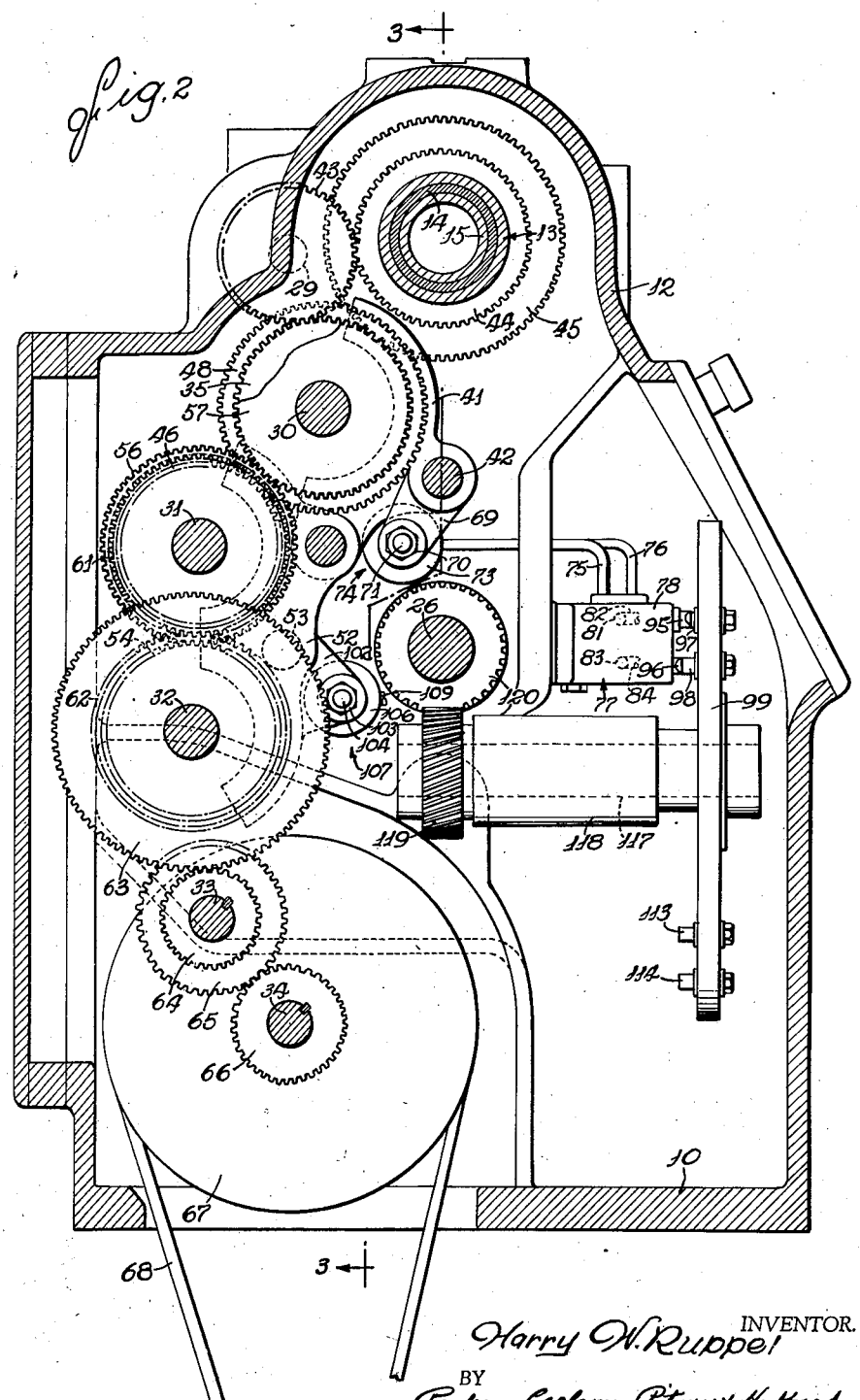

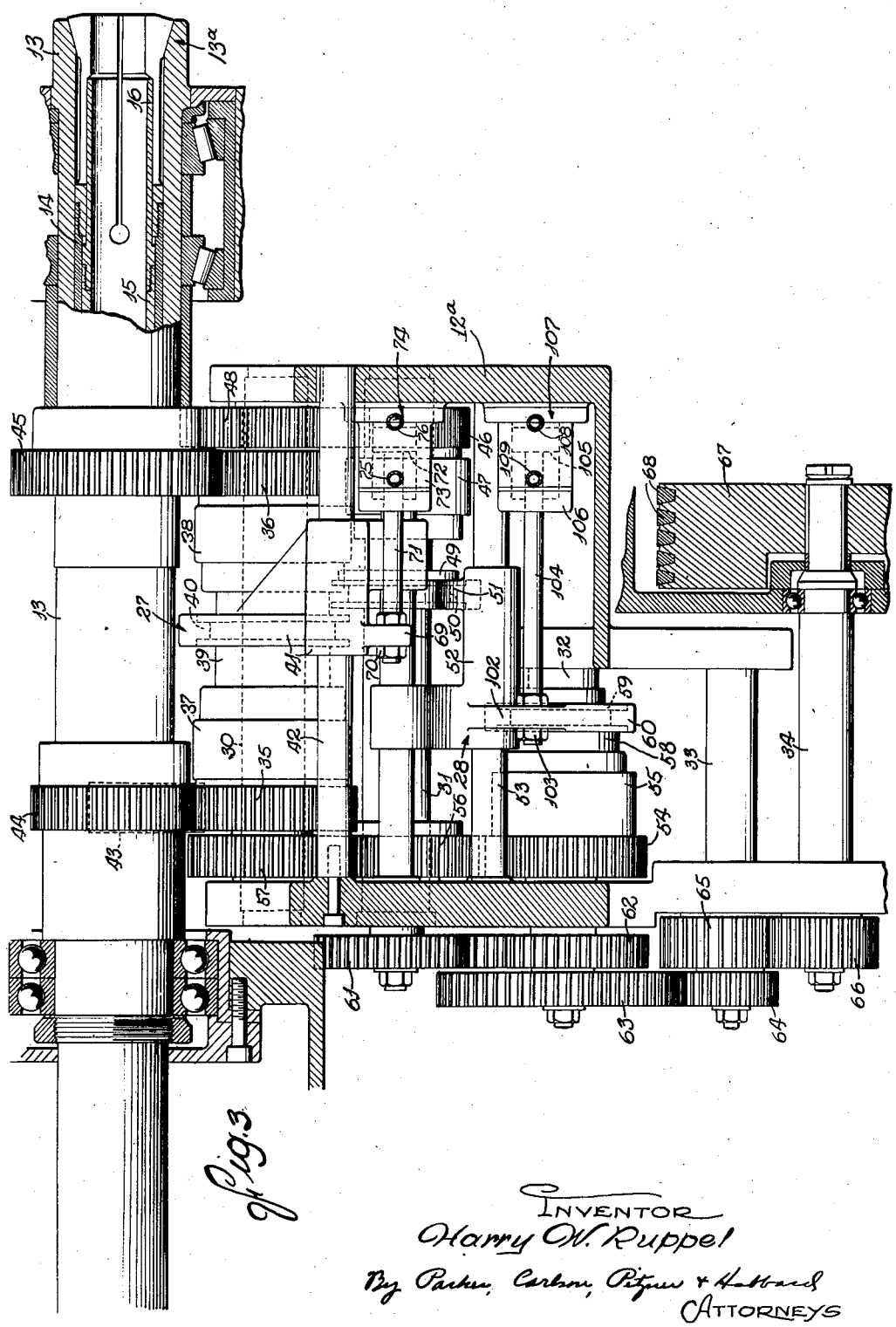

Sept. 5, 1944.                H. W. RUPPEL                2,357,427
                              SPINDLE DRIVE
                          Filed May 11, 1940          4 Sheets-Sheet 4
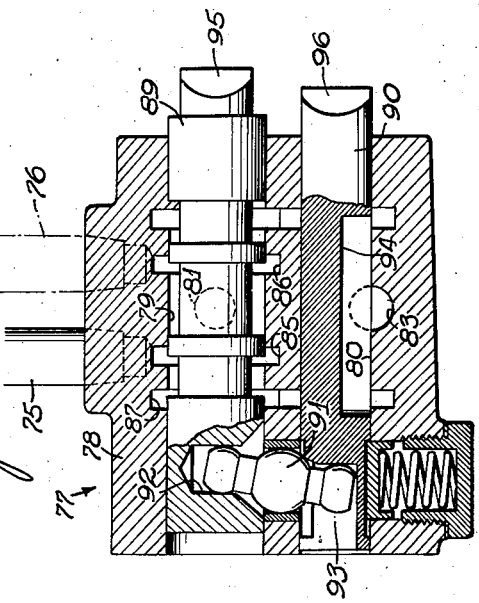
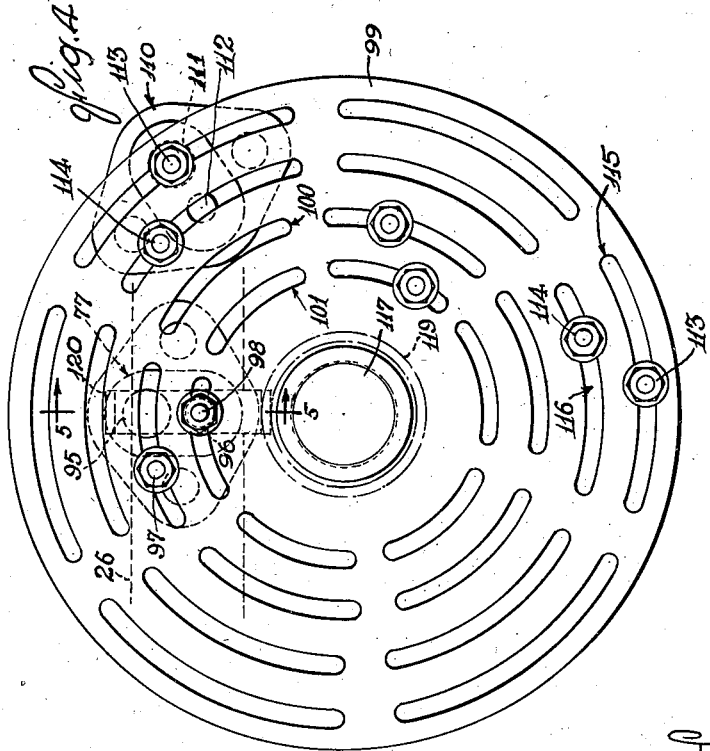

Patented Sept. 5, 1944

2,357,427

UNITED STATES PATENT OFFICE 2,357,427

SPINDLE DRIVE

Harry W. Ruppel, Cleveland, Ohio, assignor to The Foote-Burt Company, Cleveland, Ohio, a corporation of Ohio Application May 11, 1940, Serial No. 334,623

8 Claims. (Cl. 29—64)

The present invention relates to improvements in automatic screw machines, and has particular reference to a new and improved spindle drive.

One of the objects of the present invention is to provide a novel gear drive for a rotary spindle affording high and low speeds in both forward and reverse directions.

Another object is to provide new and improved hydraulic means for automatically controlling the selection of the speed and the direction of spindle rotation in a predetermined cycle.

Other objects and advantages will become apparent as the description proceeds.

In the accompanying drawings,

Figure 1 is a front perspective view of a machine having a spindle drive embodying the features of my invention.

Fig. 2 is a transverse vertical sectional view taken substantially along line 2—2 of Fig. 1.

Fig. 3 is a fragmentary sectional view, partly diagrammatic in character, substantially along the line 3—3 of Fig. 2.

Fig. 4 is a face view of a selector disk forming part of the hydraulic control means.

Fig. 5 is a sectional view on an enlarged scale of one of two similar control valves.

Referring more particularly to the drawings, the spindle drive constituting the exemplary embodiment of the invention is disclosed as forming part of an automatic screw machine. This machine (see Fig. 1) comprises a hollow elongated horizontal frame 10 rigidly mounted on a floor base 11. One end of the frame 10 is formed integral with an elevated housing 12 enclosing and rotatably supporting a hollow work spindle 13. A bar of stock (not shown) is adapted to be fed intermittently through the spindle 13 and between the jaws of an automatic chuck 13ᵃ (Fig. 3). Extending slidably through the spindle 13 is a sleeve 14 for operating the chuck. A feed tube 15 extends slidably through the sleeve 14, and is formed with a clamp 16 for advancing the bar stock. The chuck and the stock feed mechanism, which per se form no part of the present invention, are more fully disclosed in my copending application, Serial No. 334,626, filed May 11, 1940, now Patent No. 2,310,259, dated February 9, 1943. The other end of the frame 10 is provided with elevated horizontal guides 17 supporting a slide 18 for adjustment longitudinally of the spindle 13. A tool turret 19, having a plurality of annularly arranged parallel tool shank holes 20, is mounted in a turret housing 21 rigid with the slide 18 for axial reciprocation and for rotation to bring successive tools (not shown) into operation upon the bar stock projecting axially from the chuck. The means for automatically reciprocating, indexing and locking the turret 19 per se form no part of the present invention, and are disclosed in my copending application, Serial No. 334,625, filed May 11, 1940. Two cross slides 22 and 23 are mounted on the front and rear of the frame 10 between the spindle 13 and the turret 19, and are adapted to support additional tools (not shown) for operating on the bar stock. An automatically operable independent cut-off mechanism 24 is mounted on the spindle housing 12 for severing the finished work piece from the bar stock at the end of the machine operation. All of the power actuated elements of the machine hereinbefore identified, with the exception of the work spindle 13, but including the hydraulic control means in the spindle power transmission, are operable in positive timed relation, the means for this purpose deriving power from an electric motor 25 on the base 11, and including a main cam shaft 26 (see Fig. 2) extending longitudinally through the frame 10.

The spindle 13 is adapted to be driven reversibly from a prime mover, such as the electric motor 25, through a hydraulically controlled gear transmission. In general, this transmission (see Fig. 3) includes in series a reversing mechanism 27, a high and slow speed selector mechanism 28 and a novel arrangement of pick-off gears for providing an exceptionally large range of speeds. These elements of the transmission are mounted on a series of parallel shafts 29, 30, 31, 32, 33 and 34 suitably journaled in a bracket 12ᵃ secured in the spindle end of the machine frame 10.

The reversing mechanism 27 comprises two spaced outlet gears 35 and 36 normally freely rotatable on opposite ends of the shaft 30, and adapted to be alternately connected thereto by suitable clutches 37 and 38. These clutches are mounted on the shaft 30 between the gears 35 and 36, and have in common an axially movable actuating sleeve or collar 39 formed with a peripheral groove 40. Engaging in the groove 40 is a suitable yoke 41 which is slidably supported in the frame 10 by a rod 42. The gear 35 is connected through an idler gear 43 on the stub shaft 29 (see Fig. 2) to a relatively small gear 44 keyed to the spindle 13 to provide the reverse drive. The gear 36 meshes with a relatively large gear 45 keyed to the spindle 13 to provide the forward drive. It will be apparent that when the actuating collar 39 is shifted to the right the clutch 38 will be closed to establish the forward drive through the gear 36, and the clutch 37 will be opened to interrupt the reverse drive through the gear 35. Upon shifting the collar 39 in the opposite direction, the clutch 38 will be opened and the clutch 37 will be closed respectively to disconnect the forward drive and to establish the reverse drive.

The speed selector mechanism 28 comprises a gear 46 normally freely rotatable on the low speed shaft 31 and adapted to be connected thereto by a suitable clutch 47. This gear meshes with a comparatively larger gear 48 keyed to one end of the reversing clutch shaft 30. The clutch 47 is also mounted on the shaft 31, and has an axially movable actuating sleeve or collar 49 formed with a peripheral groove 50. A suitable yoke 51 engages in the groove 50, and is rigid with one end of a sleeve 52 slidably supported in the frame 10 by a rod 53. In a similar manner, a gear 54 is normally freely rotatable on the high speed shaft 32, and is adapted to be connected thereto by a clutch 55. The gear 54 is connected through an idler gear 56 freely rotatable on the slow speed shaft 31 to a gear 57 keyed to the other end of the reversing clutch shaft 30. By reason of the idler gear 56, the shaft 30 is always driven in one direction since, as will appear, the low speed shaft 31 is driven from the high speed shaft 32 through one gear step. The clutch 55 has an axially movable actuating sleeve or collar 58 formed with a peripheral groove 59. A yoke 60 rigid with the end of the sleeve 52 opposite the yoke 51 engages in the groove 59.

The clutches 47 and 55 are actuated jointly to control the speed selector mechanism 28. Upon shifting the sleeve 52 in one direction, for example, to the left, the clutch 55 will be closed to establish the high speed drive, and the clutch 47 will be opened to interrupt the slow speed drive. The reverse action occurs when the sleeve 52 is shifted to the right.

The four clutches 37, 38, 47 and 55 are not disclosed in full detail since, per se, they form no part of the present invention. They may be of any suitable character, such, for example, as the friction cone or disk type.

The low speed shaft 31 is driven from the high speed shaft 32 through two meshing pick-off gears 61 and 62, and the latter shaft in turn is driven from the secondary drive shaft 33 through two pick-off gears 63 and 64. These two sets of pick-off gears are removably splined to the outer ends of the respective shafts 31, 32 and 33. By the substitution of different pick-off gear sets any one of a substantial number of gear ratios may be obtained. While the invention is not limited to any specific number of selective spindle speeds, it may be stated that a desirable number of speeds is made available by providing fourteen selective gear ratios in the high speed drive, and eight selective gear ratios between the high and low speed shafts 32 and 31. This would provide a total of one hundred twelve selective speeds in the slow speed drive, and consequently a fine graduation of speed over a wide range. The large range and number of spindle speeds permit the accurate selection of proper surface speeds for different diameters of stock within wide requirements.

The secondary drive shaft 33 is connected through gears 65 and 66 to the power inlet or main drive shaft 34 of the transmission. Fixed on the inner end of the shaft 34 is a multiple groove pulley 67 connected by a plurality of V-belts 68 to a pulley (not shown) on the shaft of the motor 25. By mounting the gears 65 and 66 interchangeably on the respective shafts 33 and 34, two different ranges of spindle speeds are obtainable. It may be said in an explanatory though not restrictive sense that in one arrangement of the gears, as shown in Fig. 3, a range of spindle speeds from 30 to 1000 R. P. M. adapted for cutting steel is available, and that in the reverse arrangement, a range of spindle speeds from 60 to 2000 R. P. M. adapted for cutting bronze and other relatively soft metals is available.

The direction control clutches 37 and 38 as a unit and the speed control clutches 47 and 55 as another unit are operable hydraulically under interrelated control so that either forward or reverse spindle rotation may be fast or slow in a predetermined automatic cycle.

To this end, the yoke 41 for shifting the clutches 37 and 38 is connected through an integral lug or arm 69 and suitable lock nuts 70 to the free end of a rod 71 extending parallel to the shaft 30. This rod 71 is connected to a piston 72 reciprocable in a cylinder 73. The piston and cylinder constitute a hydraulic actuator 74 suitably supported in fixed position within the frame 10. Opposite ends of the cylinder 73 are connected respectively through conduits or other suitable flow passages 75 and 76 to a control valve 77 suitably mounted in fixed position within the frame 10. The valve 77 (see Fig. 5) has a body or casing 78 which is formed with two parallel bores 79 and 80 opening to one end. One bore 79 is formed with an inlet port 81 connected to a pressure fluid supply passage 82 leading from a suitable fluid source (not shown), and the other bore 80 is formed with an outlet port 83 connected to a drain passage 84. Two annular fluid directing ports 85 and 86 are formed in the periphery of the bore 79 at opposite sides of the inlet port 81, and are connected respectively to the conduits 75 and 76 leading to the hydraulic actuator 74. Two drain ports 87 and 88 open from the periphery of the bore 79, in axially spaced relation outwardly of the ports 85 and 86, to the bore 80. Reciprocable in the bores 79 and 80 are two valve members 89 and 90 which are mechanically interconnected for reverse movement. In the present instance, a rocker member 91 is mounted intermediate its ends for oscillation in the valve body 78, and pivotally engages at its opposite ends in suitable notches 92 and 93 formed respectively in the sides of the valve members 89 and 90. The valve member 89 is of the spool type, adapted in its inner position to connect the port 75 to the pressure inlet 81 and the port 76 to the drain port 88, and in its outer position to connect the port 76 to the inlet 81 and the port 75 to the drain port 87. The valve member 90 is formed in one side with an elongated notch or recess 94 adapted in all positions of adjustment to connect the drain ports 87 and 88 to the drain outlet 83.

The valve members 89 and 90 project from the valve body 78, and their outer ends constitute beveled pins 95 and 96 adapted for selective actuation respectively by similarly beveled control dogs 97 and 98 adjustably mounted on a rotary selector disk 99. In the present instance, the disk 99 is formed with two concentric sets of arcuate slots 100 and 101 permitting respective mounting of the dogs 97 and 98 in different relative positions of adjustment depending on the desired sequence and timing of the spindle reversal. Upon engagement by the dog 97, the pin 95 will be depressed, and the return pin 96 will be projected into operative position in the path of the dog 98. As a consequence, the piston 72 will be shifted to open the clutch 37 and close the clutch 38 to establish the forward spindle drive. In the continued rotation of the disk 99, the dog 98 will ultimately engage and depress the return pin 96 to project the pin 95 again into operative position in the path of the dog 97, and condition the valve 77 for reverse spindle drive. By virtue of a difference in gear ratios, the reverse drive is more rapid than the forward drive.

In the instance of the speed control clutches 47 and 55, the yoke sleeve 52 is connected through an arm 102 and suitable lock nuts 103 to the free end of a rod 104 parallel to the shafts 31 and 32. The rod 104 is connected to a piston 105 reciprocable in a cylinder 106, the piston and cylinder constituting a hydraulic actuator 107. Opposite ends of the cylinder 106 are connected through suitable flow passages 108 and 109 to a control valve 110. Both the actuator 107 and the valve 110 are mounted in fixed position within the frame 10. The valve 110 (see Fig. 4) is similar in construction to the valve 77, and has two projecting pins 111 and 112 with beveled ends adapted for selective engagement respectively by similarly beveled dogs 113 and 114 adjustably mounted on the control disk 99. These dogs are supported for selective adjustment respectively along two concentric sets of slots 115 and 116 in the disk 99. While only two dogs 113 and 114 are shown, any suitable number may be provided depending on the desired program of spindle rotation. When the fast speed pin 112 is depressed, the slow speed pin 111 is projected, and the valve 110 is adjusted to effect actuation of the piston 105 in a direction establishing the fast speed drive. Conversely, when the slow speed pin 111 is subsequently depressed, the fast speed pin 112 is again projected, and the slow speed drive is established.

The respective sets of slots 100, 101, 115 and 116 for the dogs 97, 98, 113 and 114 are located at different radial distances from the axis of the disk 99 and the valves 77 and 110 are appropriately mounted so as to avoid interference of the dogs with the unrelated valve actuating pins. It will be seen that by selective angular adjustment of the positions of the dogs various sequences and intervals of adjustment in the direction and speed of spindle rotation suited to the desired program of the machine operation may be obtained.

The control disk 99 is fixed on one end of a shaft 117 journaled in an elongated bearing sleeve 118 in the spindle end of the frame 10. A spiral gear 119 is fixed on the other end of the shaft 117 and meshes with a similar gear 120 on the shaft 26. As a result, changes in speed and direction of rotation of the spindle 13 are synchronized with the operation of the other machine elements, such as the tool turret 19, the chuck and the stock feed mechanism, in the automatic machine cycle.

The cam shaft 26 is timed to complete one revolution for each complete cycle of indexing movements of the turret 19. Consequently, it is possible to obtain an independent control of spindle speed and direction for different turret holes by providing additional sets of control dogs on the disk 99. The provision of a set of direction control dogs or a set of speed control dogs or both for any particular turret hole depends on whether the operation of the associated tool requires spindle reversal or an individual program of spindle speeds.

I claim as my invention:

1. In a machine tool, a gear transmission for driving a rotary work supporting spindle comprising, in combination, a drive element, means including a direction control mechanism and a speed control mechanism for connecting said drive element to said spindle, said direction control mechanism including a reversing clutch means operable by a reversible hydraulic actuator, said speed control mechanism including a speed selection clutch means operable by a reversible hydraulic actuator, a fluid pressure supply passage, a two position reversing valve for connecting said passage alternately to opposite ends of said first mentioned actuator, a two position reversing valve for connecting said passage alternately to opposite ends of said second mentioned actuator, a rotary power driven disk and a plurality of dogs adjustably mounted on said disk for correlated coactive engagement respectively with said valves whereby to obtain a predetermined automatic cycle of spindle rotation including forward and reverse directions of rotation and a predetermined sequence of speed changes in either direction of rotation.

2. In a screw machine, a gear transmission for driving a rotary work supporting spindle supported in a fixed axial position comprising, in combination, a drive element, means including a direction control mechanism and a speed control mechanism for connecting said drive element to said spindle, said direction control mechanism including a reversing clutch means operable by a reversible hydraulic actuator, said speed control mechanism including a speed selection clutch means operable by a reversible hydraulic actuator, valve means for selectively controlling said actuators, and power operated means for actuating said valve means in a predetermined adjustable sequence to automatically control the supply of fluid under pressure to said actuators whereby to obtain a predetermined cycle of spindle rotation including forward and reverse directions of rotation and a predetermined sequence of speed changes in either direction of rotation.

3. In a screw machine, a gear transmission for driving a rotary work supporting spindle supported in a fixed axial position comprising, in combination, a gear drive to said spindle including control clutch means, a reversible hydraulic actuator for operating said clutch means selectively in opposite directions, a pressure fluid supply passage, an exhaust passage, a valve including a reciprocable valve member for connecting said passages alternately and reversibly to said actuator, a reciprocable return plunger mechanically interconnected to said valve member for relatively alternate movement therewith, a movable carrier, a dog adjustably mounted on said carrier and adapted for direct engagement with said valve member to shift the latter into one operative position, and a dog adjustably mounted on said carrier and adapted to engage said plunger to effect movement of said valve member into its other operative position in the path of said first mentioned dog, said valve member when shifted into its first mentioned operative position serving to project said plunger into the path of said last mentioned dog.

4. In a machine tool, a gear transmission for driving a rotary spindle comprising, in combination, a gear drive to said spindle including control clutch means, a reversible hydraulic actuator for operating said clutch means selectively in opposite directions, means for controlling the supply of fluid under pressure reversibly to said actuator and including a valve having two alternately operable actuating members, a rotary control disk having two concentric series of arcuate slots, and control dogs adjustably mounted in said respective series of slots for selective engagement respectively with said members whereby to obtain operation of said actuator at timed intervals.

5. In a machine tool, a gear transmission for driving a rotary work supporting spindle comprising, in combination, a gear drive to said spindle including control clutch means, a reversible hydraulic actuator for operating said clutch means selectively in opposite directions, a pressure fluid supply passage, an exhaust passage, a valve including a reciprocable valve plunger for connecting said passages alternately and reversibly to said actuator, a reciprocable return plunger mechanically interconnected to said valve plunger for relatively alternate movement therewith, a movable disk carrier, and dog means adjustably mounted on said carrier and adapted alternately to directly engage said valve plunger to shift the latter into one operative position and said return plunger to effect reverse movement of said valve plunger into its other operative position, said valve plunger when shifted into said one operative position serving to project said return plunger into the path of said dog means.

6. In a machine tool, a gear transmission for driving a rotary work supporting spindle comprising, in combination, a gear drive to said spindle including a direction control mechanism and a speed control mechanism, a reversible hydraulic actuator for adjusting said direction control mechanism, a second reversible hydraulic actuator for adjusting said speed control mechanism, two valves for controlling respectively the supply of fluid under pressure reversibly to said actuators, each valve having two alternately operable members for adjusting said valve respectively in opposite directions, a rotary control disk, and a plurality of sets of dogs independently adjustable as to location and relative spacing and located at different radial distances on said disk for selective engagement respectively with said members whereby to obtain operation of said actuators in predetermined timed sequence.

7. In a machine tool, a gear transmission for driving a rotary work supporting spindle comprising, in combination, a gear drive to said spindle including two control clutch means, two reversible hydraulic actuators for operating said clutch means independently and selectively in opposite directions, two valves for respectively controlling the supply of fluid under pressure reversibly to said actuators, each valve including two operating abutments interconnected for relatively alternate movement into and out of a projected position, a movable disk carrier having concentric slots, and a plurality of dogs adjustably mounted in said slots on said carrier for engagement respectively with said abutments, each abutment when in projected position being in the path of the associated dog.

8. In a screw machine, a gear transmission for driving a rotary spindle comprising, in combination, a gear drive to said spindle including control clutch means, a reversible hydraulic actuator for operating said clutch means selectively in opposite directions, means for controlling the supply of fluid under pressure reversibly to said actuator and including a valve having two alternately operable actuating members, a rotary control disk having two concentric series of arcuate slots, said valve being juxtaposed to said disk and arranged with said actuating members extending normally to the plane of rotation of said disk and being radially spaced in the axial plane of said disk, and control dogs adjustably mounted in said respective series of slots for selective engagement respectively with the ends of said members whereby to obtain operation of said actuator at timed intervals.

HARRY W. RUPPEL.